May 20, 1947.  C. C. WHITTAKER  2,420,924
PNEUMATIC BEARING PROTECTIVE SYSTEM FOR TRAIN PIPE AND SIGNAL LINE
Filed Nov. 6, 1943

WITNESSES:
E. A. McCloskey
N. S. Philcot

INVENTOR
Charles C. Whittaker
BY
G. M. Crawford
ATTORNEY

Patented May 20, 1947

2,420,924

UNITED STATES PATENT OFFICE 2,420,924

PNEUMATIC BEARING PROTECTIVE SYSTEM FOR TRAIN PIPES AND SIGNAL LINES

Charles C. Whittaker, Pittsburgh, Pa., assignor to Westinghouse Electric Corporation, East Pittsburgh, Pa., a corporation of Pennsylvania Application November 6, 1943, Serial No. 509,313

3 Claims. (Cl. 246—169)

My invention relates, generally, to protective systems and, more particularly, to systems for protecting the axle bearings of railway vehicles against injury as a result of overheating.

One of the problems involved in the operation of railway trains, particularly high speed trains which operate over relatively great distances without making stops where the equipment can be inspected, is that of detecting hot boxes before serious injury is caused to the journal bearings or to the train.

An object of my invention, generally stated, is to provide a protective system for railway vehicle axle bearings which shall be simple and efficient in operation and which may be economically manufactured and installed.

A more specific object of my invention is to provide an axle bearing protective system which can be individually installed on each car of a train and will function independently of the other cars.

Another object of my invention is to provide for warning the crew of a train of the existence of an overheated axle bearing.

A further object of my invention is to provide for automatically applying the brakes of a train in the event of an overheated axle bearing.

Still another object of my invention is to utilize standard air brake equipment for indicating the existence of a hot journal box in a train.

Other objects of my invention will be explained fully hereinafter or will be apparent to those skilled in the art.

In accordance with one embodiment of my invention, a temperature responsive device, such as a fusible plug, is so disposed in each axle journal bearing of a railway vehicle that the air pressure of the air brake system is utilized to warn the train crew, or apply the brakes, in the event of an overheated bearing which causes the temperature responsive device to release the air pressure.

For a fuller understanding of the nature and objects of my invention, reference may be had to the following detailed description, taken in conjunction with the accompanying drawing, in which.

Figure 1:
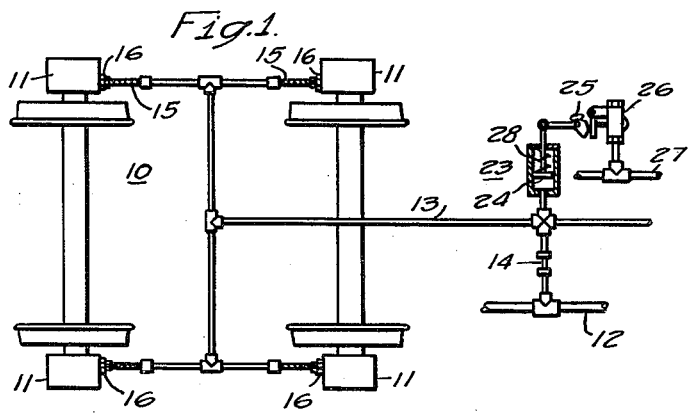
Figure 1 is a diagrammatic view of a protective system embodying the principal features of my invention.

Referring to the drawing, and particularly to Fig. 1, the system shown therein comprises a railway vehicle truck 10 having a plurality of axle bearing housings 11 which may be of the usual type of journal bearing, an air brake pipe 12 which may be connected in the air brake system in the usual manner, and a header pipe 13 which is connected to the brake pipe 12 through a limiting orifice 14. As shown, the header pipe 13 may be connected to each one of the bearing housings 11 through a flexible connection 15. In order to simplify the drawing, only one vehicle truck has been shown. It will be understood that the header pipe 13 may be connected to an additional truck in a manner similar to that illustrated.

Figure 2:
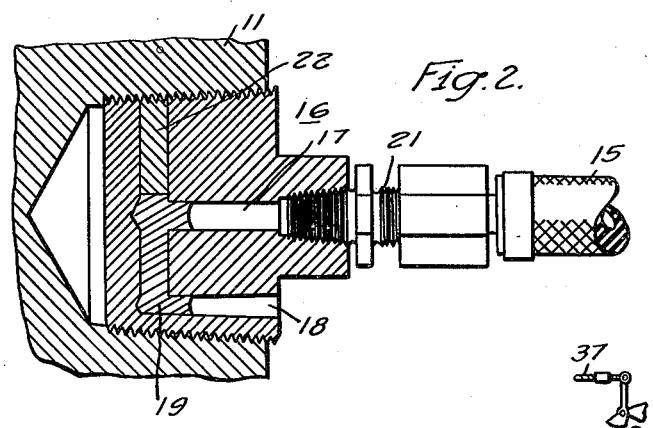
Fig. 2 is an enlarged view, in section, of a temperature responsive device utilized in the system shown in Fig. 1.

In order to protect the axle bearings in the housings 11 from injury as a result of overheating, a temperature responsive device, such as a fusible plug 16, is disposed in each one of the bearing housings 11. As shown in Fig. 2, a pair of connected openings 17 and 18 is provided in the plug 16. The openings 17 and 18 are partially filled with a fusible metal 19 which has a melting point below a dangerous temperature for the bearing disposed in the housing 11. The central opening 17 is connected to the flexible connection 15 by means of a suitable connecting member 21. One end of the opening 18 is open to atmosphere, and the other end is closed by means of a core 22 which may be inserted into the opening 18, as shown, prior to the pouring of the fusible metal 19. The body of the plug 16 is preferably composed of brass or other suitable material and is threaded into the bearing housing 11.

As shown in Fig. 1, an air operating cylinder 23 having a piston 24 disposed therein is connected to the header pipe 13. The piston 24 actuates a cam 25 which is disposed to operate a valve 26 that is connected to a signal pipe line 27. The valve 26 may be of a type usually provided on railway vehicles to enable the conductor to signal the engineer of the train by releasing air or other fluid pressure in the signal pipe line 27 which extends through the train to the engine man's cab. When a car equipped with the system shown in Fig. 1 has been standing idle sufficiently long to lose the pressure from the brake and signal lines, the brake line should be charged first, thereby building up pressure in the header pipe 13 to operate the piston 24 to close the valve 26. Otherwise the signal pipe is vented to atmosphere and cannot be charged.

During normal operation of the equipment, the fluid pressure against the piston 24 in the cylinder 23 is sufficiently high to compress a spring 28, thereby permitting the valve 26 to remain closed. In the event that the temperature of one of the bearings in a housing 11 becomes sufficiently high to melt the fusible metal 19, the pressure in the header pipe 13 blows the metal 19 out through the opening 18, thereby lowering the pressure in the header pipe 13. The decrease in pressure permits the spring 28 to rotate the cam 25, thereby opening the valve 26 to signal the engineer. The train may then be brought to a stop by the engineer making a service application of the brakes in the usual manner.

After the train has been stopped, the plug 16 may be removed from the housing 11 which has become overheated, another plug having the fusible metal 19 therein may be inserted in the housing and the flexible connection 15 connected by means of the connecting member 21. Operation of the train may be resumed after the temperature of the bearing has returned to normal. In this manner, injury to an overheated bearing, as well as to the other equipment on the vehicle, is prevented.

Figure 3:
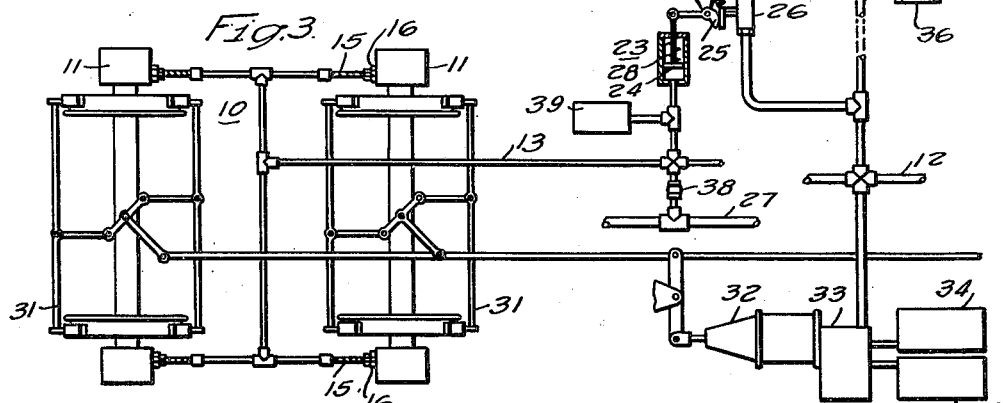
Fig. 3 is a modification of the system illustrated in Fig. 1.

In the modification of the invention illustrated in Fig. 3, in which like parts are designated by the same reference characters as in Fig. 1, the vehicle truck 10 is provided with the usual brakes 31 which are operated by air brake equipment comprising a brake cylinder 32, a triple valve 33, an auxiliary air reservoir 34, and an emergency reservoir 35 which are connected to the air brake pipe 12 in the usual manner. The conductor valve 26 and a similar valve 36, which may be operated by means of a pull cord 37 to cause an emergency application of the brakes, are connected to the brake pipe 12. The header pipe 13 is connected to the signal pipe 27 instead of the brake pipe. When an idle car is placed in service the signal line should be charged with air first, thereby charging the header pipe through either an orifice, similar to 14 in Fig. 1, or a check valve 38. The pressure in the header pipe operates the piston 24 to close the valve 26 making it possible to charge the brake pipe. A volume reservoir 39 may be connected to the header pipe 13 as shown to permit normal operation of the signalling system without decreasing the pressure in the cylinder 23 sufficiently to operate the valve 26. If a check valve is provided at 38 in place of an orifice, the reservoir 39 is not required.

In the event of one of the bearings becoming overheated, the pressure fluid is released from the header pipe 13 through the fusible plug 16 in the overheated bearing. The decrease in the pressure in the header pipe 13 causes the operation of the valve 26 in the manner hereinbefore described, thereby releasing the pressure in the brake pipe 12 and causing an emergency application of the brakes to stop the train in a manner similar to that resulting from the operation of the valve 36 by means of the emergency cord 37.

After the train has stopped, a new plug 16 may be inserted in the overheated bearing housing 11, as previously described. In this manner, the train is automatically brought to a stop before injury results to the overheated bearing.

From the foregoing description, it is apparent that I have provided a system for protecting the journal bearings of railway or other vehicles against injury from overheating which may readily be installed on each car of a train. However, the system will operate satisfactorily to protect the equipment on the cars on which the system is installed even though there are other cars in the train which are not equipped with the protective features. The system herein described may be readily installed on cars provided with standard air brake equipment, and the present system utilizes apparatus of a type with which the operating personnel of the railroads is familiar. The present system requires no electrical connections and, therefore, does not require a source of electrical energy for its operation.

Since numerous changes may be made in the above-described construction and different embodiments of the invention may be made without departing from the spirit and scope thereof, it is intended that all matter contained in the foregoing description or shown in the accompanying drawing shall be interpreted as illustrative and not in a limiting sense.

I claim as my invention:

1. In a protective system, the combination with a vehicle truck having axle bearing housings and two separate fluid pressure systems having pressure fluid therein, of means for connecting one of the fluid pressure systems to each axle bearing housing, fusible means disposed in said housings to retain the pressure fluid in said connecting means, signalling means connected to the other fluid pressure system and responsive to the releasing of said pressure fluid from the connecting means by said fusible means, and means for limiting the flow of pressure fluid from the system connected to said housings.

2. In a protective system, the combination with a vehicle truck having axle bearing housings and two separate fluid pressure systems having pressure fluid therein, of means for connecting one of the fluid pressure systems to each axle bearing housing, fusible means disposed in said housings to retain the pressure fluid in said connecting means, brake operating means connected to the other fluid pressure system and responsive to the releasing of said pressure fluid by said fusible means, and means for limiting the flow of pressure fluid from the system connected to said housings.

3. In a protective system, the combination with a vehicle truck having axle bearing housings and two separate fluid pressure systems having pressure fluid therein, of means for connecting one of the fluid pressure systems to each axle bearing housing, fusible means disposed in said housings to retain the pressure fluid in said connecting means, valve means disposed in the other one of said systems and operable by the releasing of said pressure fluid by said fusible means, and means for permitting fluctuation of the pressure in the said one system without affecting the operation of said valve means.

CHARLES C. WHITTAKER.

REFERENCES CITED

The following references are of record in the file of this patent:

UNITED STATES PATENTS

| Number | Name | Date |
|---|---|---|
| 1,544,390 | Harris | June 30, 1925 |
| 2,114,762 | Edmonds | Apr. 19, 1938 |
| 2,187,958 | Vigne et al. | Jan. 23, 1940 |
| 1,125,214 | Turner et al. | Jan. 19, 1915 |